United States Patent [19]
Chenowth

[11] Patent Number: 5,697,663
[45] Date of Patent: Dec. 16, 1997

[54] HEAP CLIMBING CONTAINER COVER SYSTEM

[76] Inventor: Lynn Chenowth, 1404 N. Marshall Ave., El Cajon, Calif. 92021

[21] Appl. No.: 579,245

[22] Filed: Dec. 27, 1995

[51] Int. Cl.$^6$ ........................................................ B60P 7/04
[52] U.S. Cl. ........................................................... 296/98
[58] Field of Search ....................................... 296/98, 100

[56] References Cited

U.S. PATENT DOCUMENTS

| | | | |
|---|---|---|---|
| 5,125,713 | 6/1992 | Willingham et al. | 296/98 |
| 5,205,605 | 4/1993 | Haddad | 296/98 |
| 5,380,058 | 1/1995 | Short et al. | 296/98 |

*Primary Examiner*—Gary C. Hoge
*Attorney, Agent, or Firm*—John R. Duncan; Frank D. Gilliam

[57] ABSTRACT

A cover system for covering open topped containers such as truck trailers carrying particulate material such as dirt, gravel, grain and the like. The cover is a flexible sheet material sized to cover the open top and can extend over the end and down the sides of the container, if desired. A roller is provided at one end of the open top for rolling up the cover to store the cover with the top open. A transverse rod runs through a hem at the opposite end of the cover. Edge guides on the rod maintain the cover in alignment with the container top when the cover is unrolled over the top. At least one freely rotatable roller or slide is provided on the rod near the rod center. A rope, strap or the like is secured to the rod to pull the rod and cover over the open top. The roller or slide allows the leading end of the deploying cover to ride up and over any heaped granular material in the container to avoid the edge digging into the material, which could prevent further deployment of the cover and could result in spillage of material forced onto the top of the cover.

20 Claims, 4 Drawing Sheets

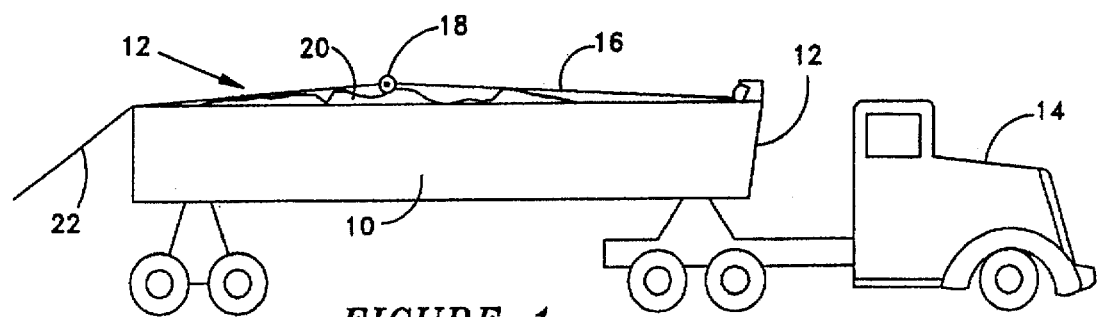
*FIGURE 1*
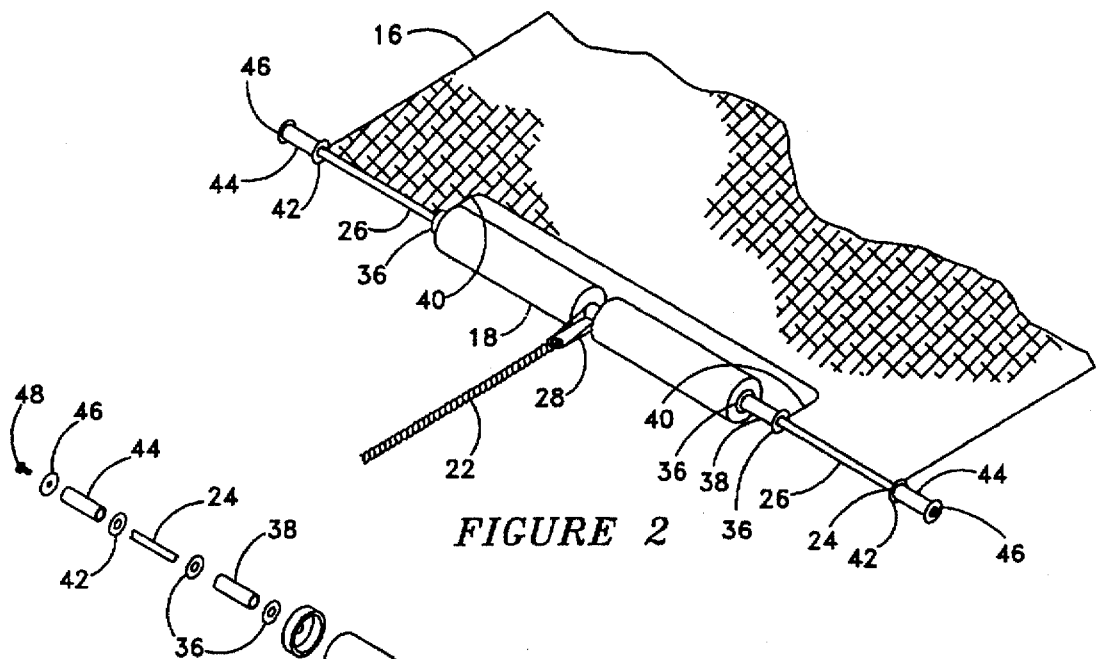
*FIGURE 2*
*FIGURE 3*
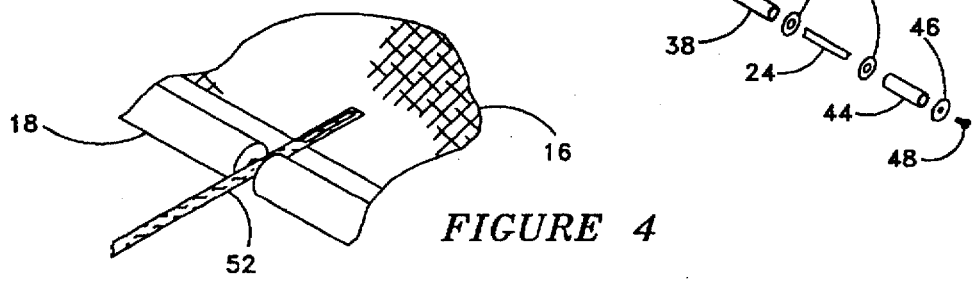
*FIGURE 4*

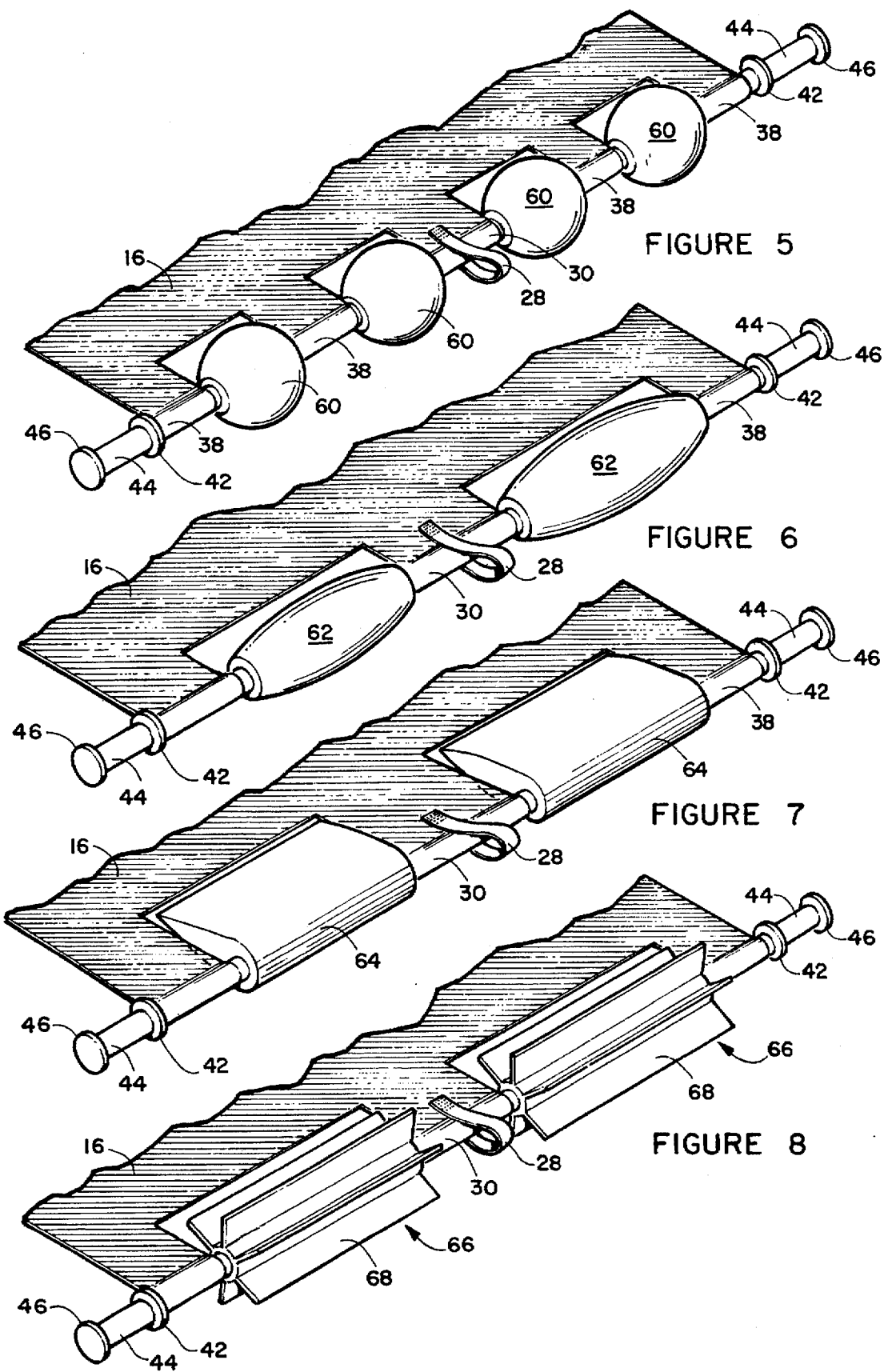

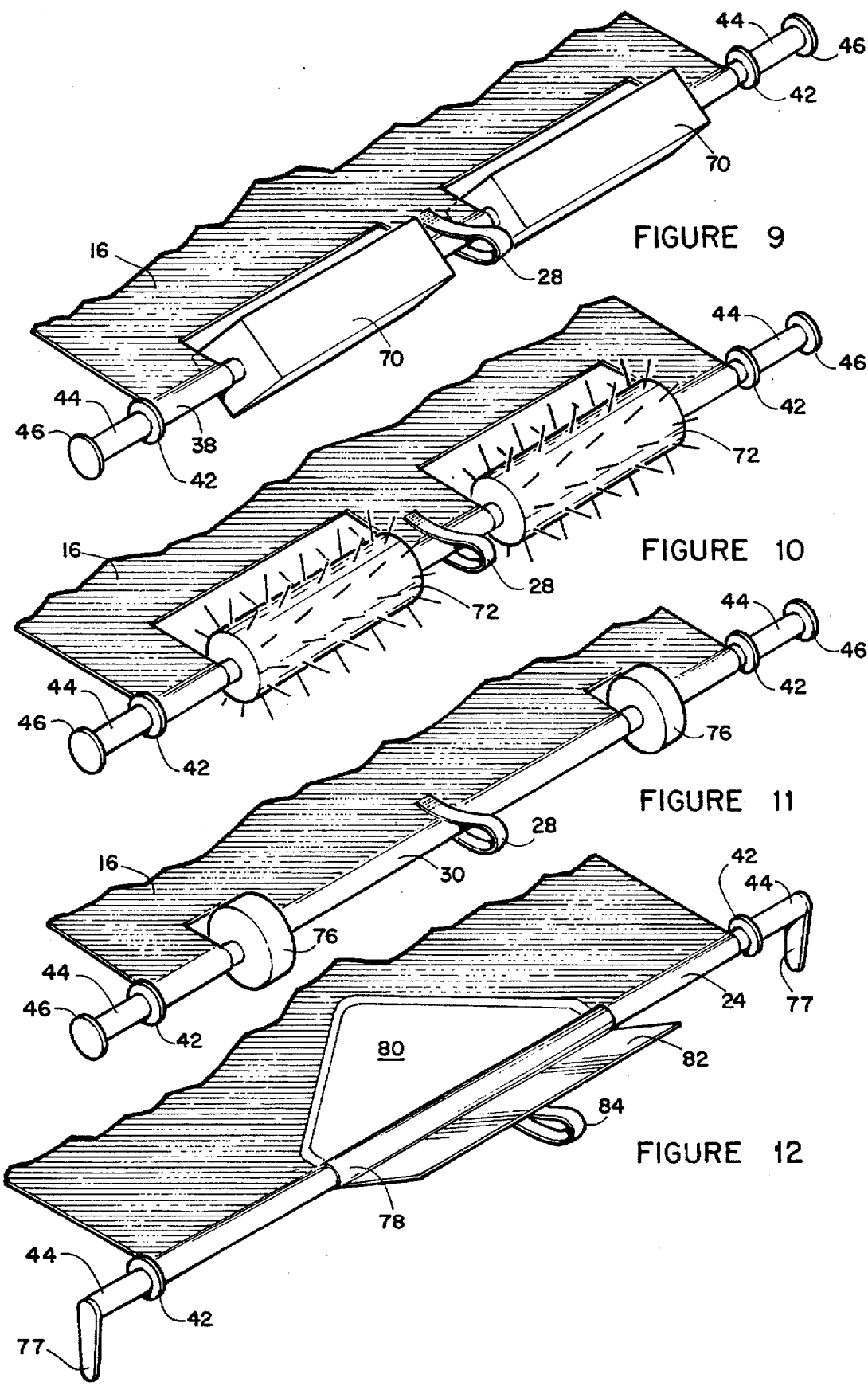

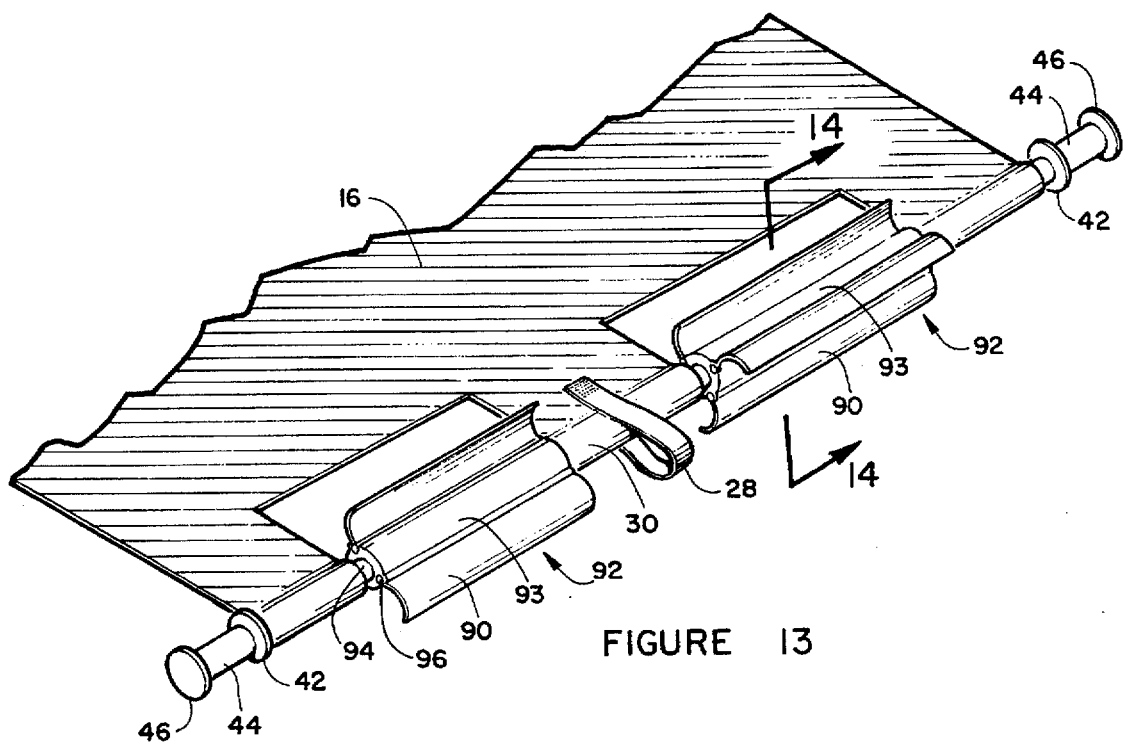
FIGURE 13
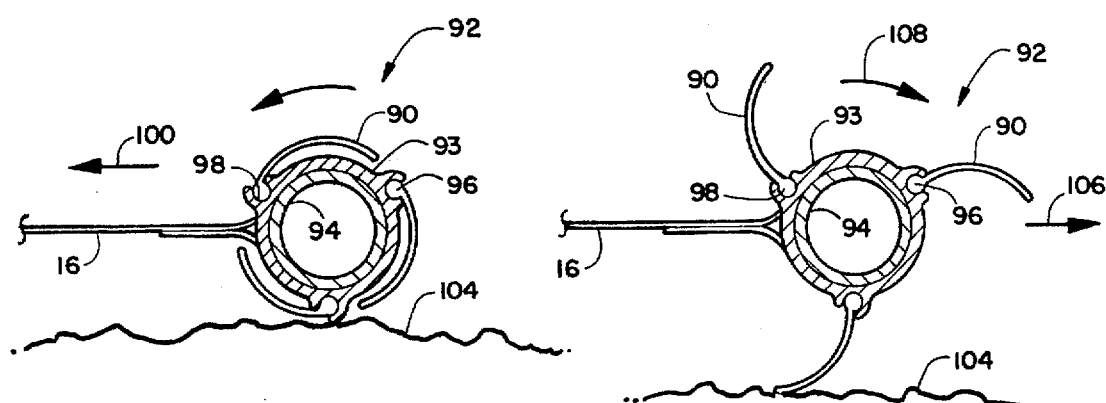
FIGURE 14
FIGURE 15

HEAP CLIMBING CONTAINER COVER SYSTEM

BACKGROUND OF THE INVENTION

This invention relates in general to covers for large open topped compartments and, more specifically to a system for installing a cover over a container where the contents extend above the container.

Open topped compartments, such as truck trailers, dump trucks, storage bins and the like used for hauling or storing particulate material such as grain, ash, lime or the like are subject to having the material fall or blow out onto the roadway. Exposure to rain, excessive sunlight, etc., is often damaging to materials being hauled or stored. With materials such as gravel, aggregate or similar materials, having portions of a load fall onto a roadway is undesirable both from the point of view of littering and the danger of the material striking a following vehicle, possibly breaking a windshield or causing an accident. Where heated materials, such as asphalt, are being stored or carried, retention of heat within the container is very desirable.

Many localities now have laws requiring that all open topped vehicle compartments be covered when containing loose or lightweight material. Often, the loads are simply covered with a tarpaulin that is tied to the edges of the open top at intervals around the opening. While sometimes effective, such tarpaulins are difficult for one person to put into place, especially in windy conditions. Often, it is necessary for the operator to climb on the vehicle or bin sides or across the load to secure the tarpaulin, at considerable personal danger. Installation is time consuming and must be carefully done to prevent an edge of the cover from loosening, allowing spillage of part of the load.

Attempts have been made to provide more convenient covers that are rolled or folded at one end of the compartment and can be unrolled or unfolded to cover the load. These arrangements are generally difficult to deploy and do not adequately secure the sides of the cover to the container sides.

Where a container is filled or overfilled with a granular material, such as dirt or gravel, to the point where the material extends above the container walls, moving a cover over the container surface, typically along and generally parallel with the container upper wall edges, is difficult. The cover edge moving along the container edges tends to dig into the material. Forcing the cover edge through the material is difficult, often impossible for a single operator. In addition, some of the material may be spilled or end up on top of the cover, defeating the purpose of the cover, since spilled or loose material on the cover will fall to the roadway, endangering other vehicles and violating laws and regulations governing covered loads.

Thus, there is a continuing need for improvements in deployable covers for open topped compartments and systems for installing them that will fully and uniformly restrain material loaded in the compartment along both the ends and sides of the compartment, can be easily moved into and out of the covering position by one person standing on the ground, will fully cover material that extends above the compartment sides and will avoid forcing heaped material over the compartment side or onto the cover upper surface from which it can fall to the roadway.

SUMMARY OF THE INVENTION

The above-noted problems, and others, are overcome in accordance with this invention by a cover system for generally rectangular open topped compartments which basically comprises a flexible cover sheet sized to cover at least the top of an open top, mechanisms for moving the cover sheet from a rolled up, stored position with the top open and uncovered to a deployed position covering the open top and a means for causing the leading edge of the cover to move up and over any material heaped above the top edges of the container. The cover sheet has first and second ends and opposed sides. A tubular means at a first end of the open top is secured to the first end of said cover sheet and is adapted to having the cover sheet wrapped therearound. A transverse rod is secured to portions of the second end of said cover sheet adjacent to the opposed sides of the cover sheet, leaving a central sheet portion or portions unattached to said rod. A deployment means is secured to the center of the rod for unrolling the cover sheet. A guide means is provided on the transverse rod adjacent to the deployment means so that as said cover is pulled over heaps of granular material in the compartment that extend upwardly above the plane of the top, the guide will move the transverse rod and cover leading edge up and over the material, carrying said cover sheet edge above the material and preventing the rod and leading sheet edge from digging into the material.

Preferably, the deployment means comprises attachment means such as a strap attached to the center of the transverse rod and a line fastened to the strap and extending over the end of the container toward which the cover is being moved for pulling the cover to the fully deployed position. Any of a number of preferred guide means may be used, as detailed below. For best results, the guides have a total width equal to from about 30 to 70 percent of the container top width.

A transverse rod end guide means is provided at each end of the rod for guiding the rod along the container edges during movement of the rod and cover between stored and deployed positions.

BRIEF DESCRIPTION OF THE DRAWING

Details of the invention, and of preferred embodiments thereof, will be further understood upon reference to the drawing, wherein:

FIG. 1 is a schematic side elevation view of a truck trailer using the cover installation assembly of this invention;

FIG. 2 is a perspective view of a cover leading edge subassembly with a wide cylindrical roller guide means;

FIG. 3 is an exploded view of the rod and roller subassembly;

FIG. 4 is a detail view showing an alternate pulling means attachment;

FIG. 5 is a perspective view of a cover leading edge subassembly with multiple rounded roller guide means;

FIG. 6 is a perspective view of a cover leading edge subassembly with elliptical roller guide means;

FIG. 7 is a perspective view of a cover leading edge subassembly with airfoil-shaped guide means;

FIG. 8 is a perspective view of a cover leading edge subassembly with multiple straight paddle wheel guide means;

FIG. 9 is a perspective view of a cover leading edge subassembly with multiple square cross section roller guide means;

FIG. 10 is a perspective view of a cover leading edge subassembly with multiple spiked cylindrical roller guide means;

FIG. 11 is a perspective view of a cover leading edge subassembly with widely spaced narrow cylindrical roller guide means;

FIG. 12 is a perspective view of a cover leading edge subassembly with a sliding panel guide means;

FIG. 13 is a perspective view of a cover leading edge subassembly with multiple curved paddle wheel guide means;

FIG. 14 is a section view taken on line 14—14, but with system in the roll-up mode; and FIG. 15 is a section view taken on line 14—14, but with the system in the deployment mode.

DETAILED DESCRIPTION OF PREFERRED EMBODIMENTS

While the cover installation assembly of this invention may be used with any open topped container, including storage bins and the like, a preferred application is covering an open topped cargo compartment of large trucks, such as dump trucks and material transporting truck trailers of the sort schematically shown in FIG. 1.

Trailer 10 includes a generally rectangular container 11 having high sides 12 with an open top and is adapted to be moved by a conventional tractor 14. Container 11 may have an openable rear side panel and a conventional hydraulic lift mechanism (not shown) to lift the front end and cause granular material to slide out the back. Any suitable granular or particulate material may be carried by such a trailer, such as dirt, sand, gravel, grain, etc.

In order to prevent a load of granular material from having particles blown out of container 11 or, where heaped above the sides 12, slide over a side during truck movement it is desirable (and often legally required) that a cover 16 be installed over the open top of container 11 whenever trailer 12 is moved. A particularly effective cover arrangement is detailed in copending U.S. patent application Ser. No. 08/258,933, filed Jun. 13, 1994. That cover is stored on a roller at one end of a container and is unrolled to deploy the cover entirely over the open container top. As described, side flaps may be included, to be deployed with the cover. That cover arrangement is very effective, in particular where the container is filled to a level not above the upper edges of the sides 12.

However, with that cover system and many others wherein a cover is moved to the deployed position along the edges of the open top problems may occur where the material is heaped above the sides. The leading edge of the cover will likely dig into the heaped material, making completion of deployment difficult. In addition, some of the granular material may end up on top of the cover, from which it might blow or slide onto the roadway during truck movement.

As seen in FIG. 1, a leading edge guide means, such as an assembly rollers 18, is provided at the leading edge of the deploying cover so that when heaped granular material 20 is encountered, the leading edge can ride up and over the heap. The leading edge guide will also serve to press down on localized heaps of material, helping to spread the material so that all of the material is at or below the top edges of the container sides 12. Thus, one person can deploy the cover by pulling on rope 22, where without leading edge guide rollers 18 or the like the leading edge may dig in to the point where deployment by one person becomes difficult or impossible.

Details of the deployment mechanism and the leading edge guide embodiment comprising rollers 18 are provided in FIGS. 2 and 3.

Cover 16 is formed from a flexible material, typically a fabric or plastic film material. A transverse rod 24 extends through tubular edges 26 in portions of cover 16 adjacent to the sheet sides, typically formed by hemming the edge of cover 16. Cover 16 is cut away between these edge portions to provide room for rollers 18. The deployment means, typically a rope 22, is secured to a loop 28 of flexible material around rod 24 at the center of the sheet edge. Alternatively, rope 22 could be a strap, typically having a width of up to about 2 inches and woven from a high strength material. Such a strap could extend along the end of the cover and be sewn thereto rather than surrounding rod 29, as shown in FIG. 4.

Details of the rod and roller assembly are provided in the exploded view of FIG. 3. A thin cylindrical rod 24 (only small portions of which are shown for clarity in illustrating the other components) extends through the components shown in FIG. 3.

A short tube 30 rotatably fits over rod 24 at the rod center about which tube 28 rides. A roller 18 is mounted on rod 24 on each side of tube 28. Rollers 18 in this preferred embodiment are made up of a central tube 32 and two end caps 34. Tube 32 and caps 34 are formed from any suitable material, such as plastic or aluminum. While one roller 18 on each side of center are preferred, several shorter contiguous tubes could be used, if desired.

An assembly of two washers 36 and spacer 38 is slipped over rod 24 into contact with the outermost end cap 34 at each side of center. The length of spacer 38 is selected to abut the edge 40 of sheet 16 to keep the roller assembly and sheet properly aligned.

At each end of rod 24 a washer 42 and spacer 44 are slipped over the rod to a position abutting the side edge of cover 16. A disk 46 having a small central hole is held to each end of rod 24 by a bolt 48 threaded into a corresponding hole in the end of rod 24. Spacer 44 with washer 42 and disk 46 form an edge guide that moves along the upper side edge of container 12 to cause the cover assembly to stay in alignment with the container top opening during deployment and rewinding.

Rollers 18 may have any suitable dimensions.

FIG. 4 shows an alternative embodiment of the means for pulling cover 16 over container 11. Here the elongated pulling means is a flat strap 52, preferably having a thickness of 0.1 to 0.2 inch and a width of 0.5 to 2 inches, formed from any high strength woven material. Strap 52 extends over tube or bushing 30 (as seen in FIG. 3) and overlaps cover 16. The end of strap 52 over sheet 16 is sewn thereto with high strength thread. If desired, a doubler sheet (not shown) may be sewn to cover 16 to enlarge and reinforce the area to which strap 52 is fastened. This embodiment has the advantage of avoiding bowing of rod 24 during pulling.

Several alternative embodiment of the leading edge guide means are illustrated in FIGS. 5–12.

Each of these guide means replaces rollers shown in FIGS. 1–3. In each of these embodiments, cover 16, transverse rod 24, washers 36 and 42 and tubes 30, 38 and 44 are as discussed above, except that the lengths of tubes 30 and 38 are varied to accommodate the different guide configurations.

As seen in FIG. 5, four widely spaced narrow rollers 60, having equal lengths and widths, preferably having a generally spherical cross section in a plane that includes transverse rod 24 are provided. Preferably rollers 60 are spaced approximately equal distances apart, with the outermost rollers spaced apart about 60 to 80% of the width of cover 16. This embodiment is particularly desirable where rough, large particle size material is being carried, such as large gravel and the like. The narrow, spherical rollers roll easily over such material.

FIG. 6 shows an embodiment using two spaced rollers that have generally elliptical axial or lengthwise cross sections and generally circular transverse cross sections. The centers of the rollers are preferably spaced apart about 50 to 70% of the cover width. While rollers 12 may have any suitable dimensions, diameters in the range of about 2 to 6 inches, lengths of about 2 to 5 times the diameter are preferred for optimum deployment efficiency. The sum of the lengths is preferably about 30 to 70% of the width of sheet 16. These rollers move particularly well over medium sized gravel and the like.

FIG. 7 shows an embodiment using generally tapered, airfoil-like, members 64, which slide up and over heaped material. Members 64 are pivotally mounted on transverse rod 24 which passes through the thicker airfoil leading edge parallel to the leading edge. Best results are obtained where members 64 have thicknesses in the range of about 2 to 6 inches and the sum of the axial lengths of members 64 is about 30 to 70% of the width of sheet 16.

An embodiment using paddle wheel guide members 66 is shown in FIG. 8. While flexible or stiff blades 68 may be used, flexible blades that deflect only sightly when in contact with a heap of material are preferred. While rollers 18 may have any suitable dimensions, paddle wheel diameters in the range of about 2 to 6 inches are preferred.

"Rollers" 70 having a generally square transverse cross section are shown in FIG. 9. Although four sides to roller 70 is preferred, any suitable polyhedral transverse cross section having three or more sides may be used as desired. While rollers 70 may have any suitable dimensions, diameters across faces in the range of about 2 to 6 inches and total axial lengths of from about 30 to 70% of the width of sheet 16 are preferred.

FIG. 10 shows an embodiment in which rollers 72 have a plurality of outwardly extending spikes 74. Any suitable number of spikes may be used. Preferably spikes 74 extend from about 1 to 3 inches above the roller. Ideally, the rollers 72 have the dimensions mentioned for rollers 18, above. This embodiment is particularly preferred for use with very soft heaped material, since the spikes will help keep the rollers turning and prevent the rollers digging into the heap.

For use with very course, hard heaped material, the embodiment shown in FIG. 11 may be preferred. Two narrow, widely spaced, relatively large diameter rollers 76 are provided on rod 24. While rollers 76 may have any suitable dimensions, diameters in the range of about 4 to 10 inches, and a transverse width to axial thickness ratio of at least 2 are preferred.

An embodiment in which a guide means slides up and over heaped material is shown in FIG. 12. Here, a tubular hub 78 fits around rod 24. Two flanges 80 and 82 are secured to hub 78 at an angle to each other. First flange 80 is fastened to cover 16, such as by adhesive bonding, sewing or the like. Second flange 82 is secured to hub 78 at an acute angle to flange 89 so that flange 82 extends upwardly as the cover is drawn over a heap of material in the container, sliding up and over the heap. A strap 84 is fastened to tube 78 and/or flange 82 for fastening to a pulling means such as a rope. This arrangement is simple, works especially well with soft material in resisting digging in and will also tend to smooth out the heap.

Another preferred embodiment is shown in FIG. 13–15. This embodiment is generally similar to that shown in FIG. 8, except that here the blades of each paddle wheel 92 are hinged and curved so that the convex side of each blade 90 contacts the surface of the heaped material as strap 28 is pulled to cover the load. A flexible material which will bend slightly in contact with the heap is preferred for best tracking.

An outer tube 93 is rotatably positioned around an inner tube 94. At least one, and preferably three as shown, blades 90 have edges 96 with a generally circular cross section, each fitted in a channel 98 configured so as to act as a hinge, permitting movement of the blade between the positions shown in the section views of FIG. 14 (roll-up mode) and that shown in FIG. 15 (deployment mode).

As seen in section views in FIG. 14, when the paddle wheel assemblies 92 are pulled in the direction indicated by arrow 100, paddle wheel 92 rotates in the direction indicated by arrow 102 to fold blades 90 against tube 93, allowing the assembly to roll along material 104.

When paddle wheel assemblies 92 are pulled (by pulling on strap 28, FIG. 13) in the direction indicated by arrow 106 in FIG. 15, each paddle wheel rotates in the direction indicated by arrow 108, causing the free edges of each blade 90 to dig into material 104 and open up to a large diameter that permits the assembly to easily climb up and over a heap of material 104 without pushing the material ahead of the paddle wheels.

While certain preferred materials, dimensions and arrangements have been described in detail in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. A cover installation assembly for installing a cover over a top of an open topped container which may contain granular material extending above said open top which comprises:

a sheet of material sized to at least cover said open top having first and second ends and opposed sides;

tubular means at said first end of said container secured to said first end of said sheet for storing said sheet with said open top generally uncovered;

a transverse rod secured to portions of said second end of said sheet adjacent to said sheet sides;

deployment means for moving said sheet toward said second end;

at least one heap climber roller means mounted on said rod on each side of said rod center; and guide means at each end of said rod for guiding ends of said rod along container side edges when said sheet is moved between covered and uncovered positions;

whereby as said sheet is moved from a rolled position to a deployed position said heap climber means causes said second edge of said sheet to move upwardly over a heap of granular material extending above said container top without digging into said heap of material.

2. The assembly according to claim 1 wherein at two rollers are provided on each side of said rod center and each roller has a length no greater than each roller's width.

3. The assembly according to claim 2 wherein each of said rollers is generally spherical.

4. The assembly according to claim 1 wherein said rollers have diameters of from about 2 to 6 inches and the sum of widths of said rollers equals from about 30 to 70 percent of sheet material width.

5. The assembly according to claim 1 wherein said heap climber means comprises at least one roller on each side of said rod center, each roller having a generally circular transverse cross section and an approximately elliptical axial cross section.

6. The assembly according to claim 5 wherein said rollers have diameters of from about 2 to 6 inches and the sum of widths of said rollers equals from about 30 to 70 percent of said width of said sheet material.

7. The assembly according to claim 1 wherein said heap climber means comprises at least one roller on each side of said rod center, each roller having a generally polyhedral transverse cross section and a generally uniform axial cross section.

8. The assembly according to claim 7 wherein said rollers have diameters of from about 2 to 6 inches and a sum of said widths of said rollers equals from about 30 to 70 percent of sheet material width.

9. The assembly according to claim 1 wherein said heap climber means comprises at least one roller on each side of said rod center, each roller having a generally square transverse cross section and a generally uniform axial cross section, axial length of each roller being at least 3 times maximum width.

10. The assembly according to claim 1 wherein said heap climber means comprises at least one roller on each side of said rod center, each roller having a generally circular transverse cross section and a generally uniform axial cross section and further including a plurality of spikes extending outwardly from each roller's transverse surface.

11. The assembly according to claim 10 wherein said rollers have diameters of from about 2 to 6 inches and a sum of widths of said rollers equals from about 30 to 70 percent of sheet material width.

12. The assembly according to claim 1 wherein said heap climber means comprises at least one roller on each side of said rod center, each roller having a generally circular transverse cross section and a generally uniform axial cross section, diameter of each roller being at least twice the axial length of each roller.

13. The assembly according to claim 1 wherein said heap climber means comprises at least one roller on each side of said rod center, each of said rollers comprising a hub surrounding said transverse rod and a plurality of upstanding axial paddle wheel blades, each blade being hinged to said hub and movable between a first position lying along said hub and a second position extending outwardly from said hub.

14. The assembly according to claim 13 wherein said paddle wheel blades are formed from flexible material and are secured to said hub along lines lying parallel to a hub axis.

15. The assembly according to claim 13 wherein three paddle wheel blades are provided, spaced substantially equally around said hub.

16. The assembly according to claim 13 wherein said paddle wheel blades are hinged along one blade edge to said hubs with said hinged edge leading as said heap climber means is moved toward said first container end so that said blades assume said first position when said heap climber means is moving toward said first container end and assume said second position when said heap climber means is moving toward said second container end.

17. The assembly according to claim 1 wherein said rod is threaded through a hem in said second edge of said sheet.

18. The assembly according to claim 1 wherein said deployment means comprises a rope extending from a strap slidably surrounding said rod between said heap climber means at said center, over an end of said container toward which said sheet is deployed.

19. The assembly according to claim 1 wherein said deployment means comprises a strap extending past said rod, over a tube between said heap climber means and fastened to an upper center of said sheet adjacent to said second sheet edge.

20. The assembly according to claim 1 further including powered means for rotating said tube to wind said sheet therearound.

* * * * *